United States Patent Office 3,192,274
Patented June 29, 1965

1

3,192,274
PROCESS FOR REMOVING NON-TERMINAL HALOGENS FROM SATURATED PERHALOCARBONS
Charles F. Baranauckas, Niagara Falls, and Russell L. K. Carr, Grand Island, N.Y., assignors to Hooker Chemical Corporation, Niagara Falls, N.Y., a corporation of New York
No Drawing. Filed May 4, 1960, Ser. No. 26,732
5 Claims. (Cl. 260—653.5)

This invention relates to a process for the removing of non-terminal halogens from saturated perhalocarbons, thereby introducing a double bond into the compound.

It is an object of this invention to provide a new process for the introduction of a non-terminal double bond in a perhalocarbon.

Another object is to provide a process such that the raw material is converted to the desired product with a minimum of by-product formation, and the unreacted starting material can be recovered and recycled for further conversion to the desired products.

A further object is to provide a dehalogenation process wherein the reaction pressure may be maintained at about atmospheric pressure.

Various other objects and advantages will be apparent to those skilled in the art from the following description and disclosure.

The present invention is concerned with a process for saturated perhalocarbons wherein single non-terminal halogen atoms are removed from each of two adjacent carbon atoms to introduce a carbon-to-carbon non-terminal double bond in the perhalocarbon which comprises introducing the starting material into a reaction zone containing a carbon catalyst and maintained at a temperature between about two hundred and seventy-five and four hundred and fifty degrees centigrade, and withdrawing the product therefrom. Although one can introduce hydrogen fluoride along with the starting material, the introduction of hydrogen fluoride is not always necessary and may not be advisable. The theory of the process of this invention is not completely understood. The free halogens and acidic materials are absorbed from the effluent gases and the unsaturated product perhalocarbon isolated from the reaction mixture thereafter, preferably by distillation means. The unreacted material can be recycled for further use in the process. The desired unsaturated product is then isolated.

The invention is illustrated by the following equations but not limited thereto:

(1)
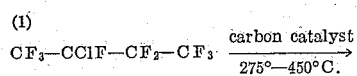
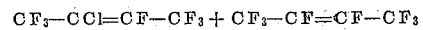

(2)
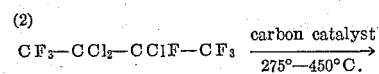
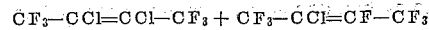

The preferred perhalocarbon starting materials of this invention have from four to eight carbon atoms and contain a non-terminal —CClX—CX'X''— group, where X, X' and X'' are chlorine or fluorine.

2

Among the starting materials which may be used in the process of this invention are: 2-chlorononafluorobutane, 2,2,3-trichloroheptafluorobutane, 2,2,3,3-tetrachlorohexafluorobutane, 2,2,3-trichlorononafluoropentane, 1,1,2-trichloropentafluorocyclobutane, 1,1,2,2-tecrachlorooctafluorocyclohexane, 1,1,2 - trichloroheptadecafluoro-1-cyclohexylbutane, and the like. The result of the process of this invention is to introduce a non-terminal carbon-to-carbon double bond into the compound.

As will become more evident hereinafter, this invention presents a technique for introducing a non-terminal double bond by preferential dehalogenation which is accomplished by the use of a carbon catalyst in conjunction with a critical temperature. The optimum temperature range is between two hundred and seventy-five and about four hundred and fifty degrees centigrade. More preferably the temperature range is between about three hundred and four hundred and twenty-five degrees centigrade.

The contact time may vary from about 0.1 second to about thirty seconds, although the preferred contact time is between about three seconds and fifteen seconds.

When both the starting material and hydrogen fluoride are employed, the proportions of reactant contacted with a catalyst may vary within relatively wide limits depending largely upon the nature of the reactants, the conditions of operations and the results desired. If hydrogen fluoride is used, it is preferred that it be substantially anhydrous. The molar ratio of hydrogen fluoride to starting material may vary from about zero to about 4.5 to one. As long as the materials are preheated to the desired reaction temperature prior to contact with the catalyst, it matters little in what manner they are introduced. In practice, it is customary to preheat the materials and introduce them simultaneously into the reaction zone containing catalyst. After passing through the reaction zone the effluent gases may be cooled and purified and the unreacted raw materials recovered for repassing over the catalyst.

Atmospheric pressure was employed in all the reactions; however, pressures below and above atmospheric would also give satisfactory results.

A specific catalyst used in this invention is that prepared by Barnebey-Cheney Company, Columbus, Ohio, and marketed as "BD-9" granular active carbon which by analysis showed an ash content of 1.6 percent. However, other types of carbon may also be used.

For the purposes of this invention contact time is defined as the ratio between the free space in the reactor (in arbitrary volume units) and the sum of the rates at which the reactants entered the reactor (in the same arbitrary volume units per unit time). An estimate of the free space was obtained in following way: a graduated cylinder was filled to a given volume mark with catalyst, to this was added an equal volume of solvent liquid and the total volume of the mixture was observed. The difference in volume between that of the mixture and the original solvent represented the space occupied by the catalyst. From this the free space in any catalyst filled container could be estimated provided the volume of said container when empty were known. The rates at which the gaseous reactants entered the reactor was obtained from the molar feed rates per unit time with the application of Charles's law relating the volume of a gas to its absolute temperature (it was assumed that at the temperatures used deviations from ideality were negligible).

The reactor consisted of a one-inch diameter nickel pipe, twenty-seven inches long immersed in a salt bath, and having a one-quarter inch inlet and outlet as well as a thermometer well. The reactor was packed with a catalyst and the temperature maintained reasonably constant by convenient means. The exit end of the reactor was slightly lower than the entrance in order to minimize channeling. The inlet tube was also immersed in the salt bath to serve as a preheater for the inlet gases. It is within the realm of this invention to employ a vertical reactor similar in all respects to the horizontal reactor. It is also possible to use a fluidized bed reactor.

It is to be understood that the invention is not limited to the type of reactor, or the means of heating the catalyst bed, for there are several convenient apparatus means for effecting the process of this invention.

The invention will be more fully understood by reference to the following detailed examples in which the parts are by weight. For convenience, a process is described in connection with specific substances, but they are presented only for the purposes of illustration and not as a limitation.

*Example 1*

The compound 2-chlorononafluorobutane $$(CF_3-CClF-CF_2-CF_3)$$

(two hundred and seventy-nine parts, one mol) (whose boiling point range was twenty-seven to thirty degrees centigrade), and hydrogen fluoride (eighty parts, four mols), were passed through the catalyst-filled reactor at flow rates of approximately 0.41 mol per hour and 1.5 mols per hour respectively. The catalyst used was Barnebey-Cheney Company, "BD-9" active carbon and the temperature of the reactor was maintained at about three hundred and ninety degrees centigrade. The total time required to react this amount of material was about two hours and forty minutes, and the contact time over the catalyst was in the range of nine to eleven seconds. The product was collected and fractionated into thirty-eight parts boiling from nine to twenty-eight degrees centigrade, one hundred and fifty-nine parts boiling at twenty-eight to 30.5 degrees centigrade, and sixteen parts residue.

The lower boiling fraction was shown by examination of its infrared spectrum to contain $CF_3CF=CFCF_3$. The fraction boiling at twenty-eight to 30.5 degrees centigrade is unreacted starting material.

*Example 2*

The compound 2-chlorononafluorobutane (one hundred and forty-three parts, 0.56 mol), and hydrogen fluoride (thirty-six parts, 1.8 mols), were passed through the catalyst-filled reactor at flow rates of 0.3 mol per hour and two mols per hour respectively. The catalyst was the same as in Example 1, and the temperature of the reactor was maintained in the range of two hundred and ninety degrees centigrade. The total time required to react this amount of material was about 1.8 hours, and the contact time over the catalyst was in the range of twelve to sixteen seconds. The product was collected and determined by infrared analysis to contain $$CF_3-CF=CF-CF_3$$

*Example 3*

The organic starting material 2,2,3-trichloroheptafluorobutane (three hundred and fifty parts, 1.22 moles) was passed through a tubular nickel reactor containing active carbon at two hundred and ninety plus or minus ten degrees centigrade over a period of one hour and forty-three minutes, at an average flow rate of 0.7 mole per hour. The effluent product was cooled, condensed, washed acid free and dried. An infrared analysis of the product revealed the presence of 2,2,3-trichloroheptafluorobutane (eighty-six percent), 2-chloroheptafluorobutene-2 (four percent), and 2,3-dichlorohexafluorobutene-2 (ten percent).

*Example 4*

The procedure of Example 3 was repeated at three hundred and fifty plus or minus ten degrees centigrade. The effluent organic material contained seventy-six percent 2,2,3-trichloroheptafluorobutane, eight percent 2,3-dichlorohexafluorobutene-2, and eleven percent 2,2-dichlorooctafluorobutane.

*Example 5*

The starting material 2,2-dichlorooctafluorobutane (three hundred and seventy-two parts of 1.37 moles), and hydrogen fluoride (one hundred and five parts of 5.25 moles), were preheated to about three hundred and ninety degrees centigrade and passed through a tubular reactor containing active carbon at three hundred and ninety degrees centigrade over a period of about one hour and fifteen minutes. After purging with nitrogen for fifteen minutes the organic product which had been collected under water was washed, neutralized and dried. An infrared analysis of the combined product (two hundred and sixty-four parts), showed the presence of 2,3-dichlorohexafluorobutene-2, four to five percent; 2-chloroheptafluorobutene-2, thirteen percent; 2,2-dichlorooctafluorobutane, fifty-six percent; and 2-chlorononafluorobutane, twenty-six percent. The lower boiling materials were removed by distillation and analysis showed them to contain 2-chloroheptafluorobutene-2, twenty-two percent; and 2-chlorononafluorobutane, seventy-eight percent.

From the above description and examples it can be seen that by-products can be recycled for further use in the process without departing from the scope of our invention. For instance, in the manufacture of octafluorobutene-2, by-product unsaturated perhalobutene-2 materials can be halogenated and recycled with recovered unreacted starting material for reuse in the process.

The compounds produced by the process of this invention are olefins and may be used as monomers and co-monomers for polymerization. Oxidation of the products results in perhalo monobasic acids and dibasic acids.

It is to be understood that the invention is not limited to the examples which have been given. They are only illustrative and modifications may be made within the scope of the appended claims without departing from the spirit of the invention.

We claim:

1. The process for introducing a non-terminal double bond in a saturated perchlorofluorocarbon starting material of the formula:

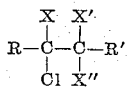

where X, X' and X" are selected from the group consisting of chlorine and fluorine and R and R' are lower perhaloalkyl groups, which comprises introducing material consisting essentially of the starting material into a reaction zone containing a carbon catalyst and maintained at a temperature between about 275 degrees centigrade and about 450 degrees centigrade, and withdrawing the product from said zone.

2. The process of claim 1 wherein the contact time of the starting material is from about 0.1 second to about thirty seconds.

3. The process for introducing a non-terminal carbon-to-carbon double bond in 2-chlorononafluorobutane which comprises introducing material consisting essentially of 2-chlorononafluorobutane into a reaction zone containing a carbon catalyst and maintained at a temperature between two hundred and seventy-five and four hundred and twenty-five degrees centigrade, and recovering octafluorobutene-2 and 2-chloroheptafluorobutene-2 from the withdrawn product mixture.

4. The process for introducing a non-terminal carbon-to-carbon double bond in 2,2,3-trichloroheptafluorobutane which comprises: introducing material consisting essentially of 2,2,3-trichloroheptafluorobutane into a reaction zone containing a carbon catalyst and maintained at a temperature between about two hundred and seventy-five and four hundred and twenty five degrees centigrade, and recovering 2-chloroheptafluorobutene-2, and 2,3-dichlorohexafluorobutene-2 from the withdrawn product.

5. The process for introducing a non-terminal carbon-to-carbon double bond in 2,2-dichlorooctafluorobutane which comprises: introducing material consisting essentially of 2,2-dichlorooctafluorobutane into a reaction zone containing a carbon catalyst and maintained at a temperature between about three hundred and forty and about four hundred and fifty degrees centigrade and recovering 2-chloroheptafluorobutene-2 and 2,3-dichlorohexafluorobutene-2 from the withdrawn product.

References Cited by the Examiner
UNITED STATES PATENTS

| | | | |
|---|---|---|---|
| 2,697,124 | 12/54 | Mantell | 260—653.5 |
| 3,006,727 | 10/61 | Ruh et al. | 260—653.5 |

LEON ZITVER, *Primary Examiner.*

ALPHONSO D. SULLIVAN, *Examiner.*